Dec. 22, 1959  P. A. GOOLKASIAN  2,918,054
ELECTRICALLY RESPONSIVE REPETITIVE-SURGE INDICATORS
Filed Sept. 9, 1957
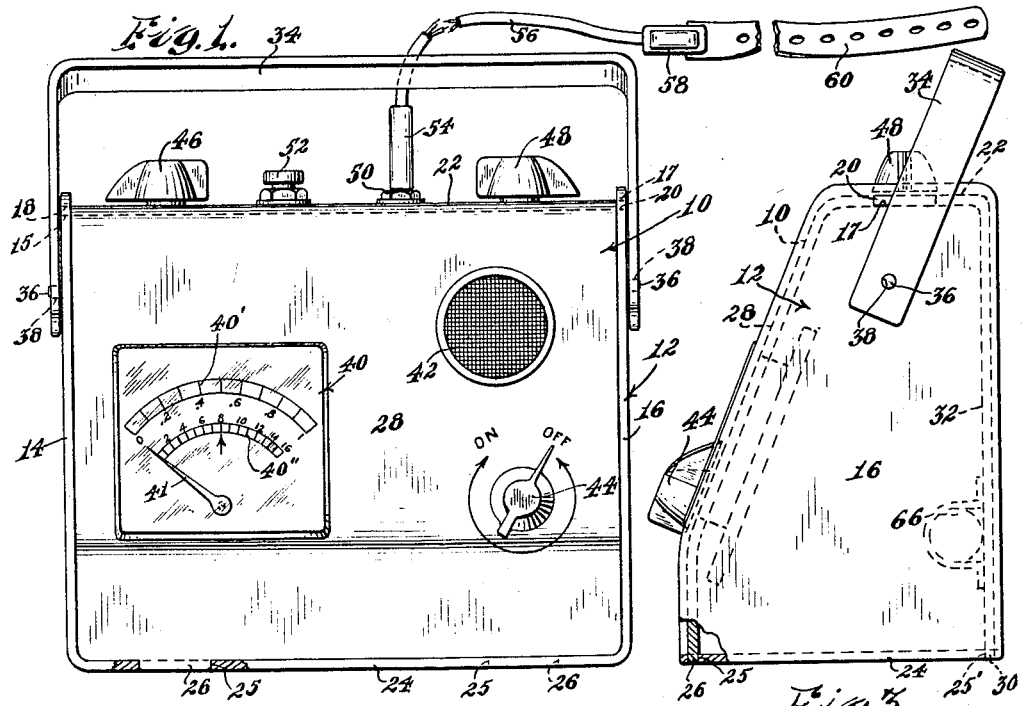
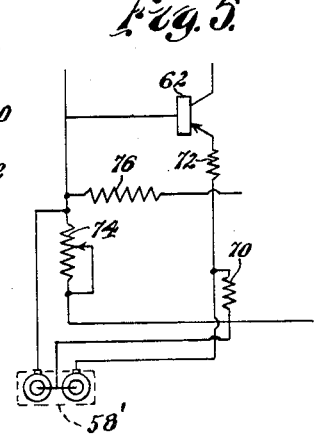
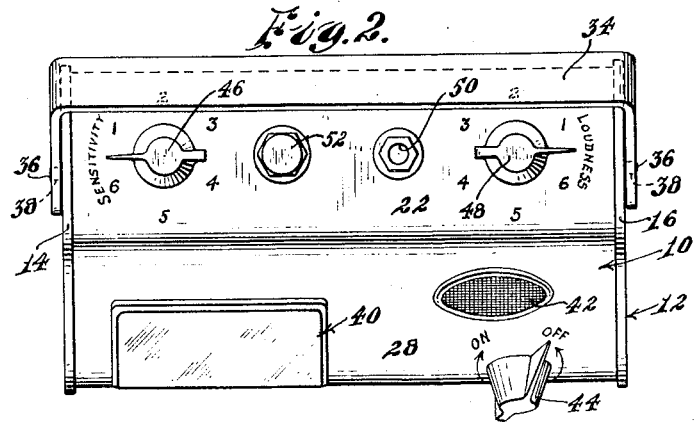
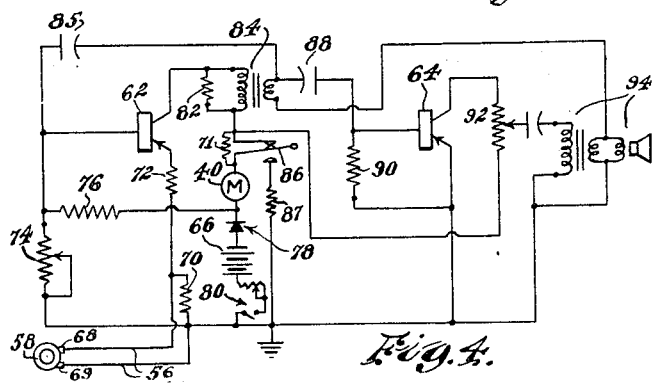
INVENTOR.
Peter A. Goolkasian
BY John H. McKenna United States Patent Office 2,918,054
Patented Dec. 22, 1959

2,918,054

ELECTRICALLY RESPONSIVE REPETITIVE-SURGE INDICATORS

Peter A. Goolkasian, Waltham, Mass.

Application September 9, 1957, Serial No. 682,721

12 Claims. (Cl. 128—2)

This invention relates to improvements in electrically responsive repetitive-surge indicators. More particularly, the invention provides novel means for indicating characteristics of undulatory surges of mediums whose surge variations may be utilized to control the indicating means in response to surge-induced resistance changes in an electrical circuit. The repetitive surges may be the result of a pulsating fluid or of voltage surges in an electrical circuit, for example. The invention is herein disclosed in an embodiment which is especially well suited for indicating visually and/or audibly certain characteristics of the human pulse, such as during the progress of an operation on a patient, or while a seriously ill person is being transported in an ambulance, or the like.

Various devices are presently available which are capable of visual indication of characteristics of the human pulse. However, so far as I am aware, these prior devices have not been entirely satisfactory for various reasons. Some have required relatively expensive electronic circuitry with electronic tubes and needed auxiliary equipment, operating from any available 110 v. circuit, while others, of low voltage, battery-operated variety, have not been dependable in all cases as indicators of pulse characteristics because they reflect heart activity rather than the character of the pulsing blood surges at any particular body location.

It is among the objects of the present invention to provide a small and compact light-weight portable audio and/or visual electrically responsive repetitive-surge indicator wherein audible means may indicate the frequency of repetitive surges of fluid or voltage and the intensity and duration of the individual surges and, when desired, visual means may indicate the same characteristics of the said repetitive and individual surges.

Another object of the invention is to provide a readily portable, low-cost audio-visual electrically responsive apparatus having pressure-responsive variable resistance means in a low voltage circuit for controlling a transistorized oscillator-amplifier circuit wherein visual and audio indicating means are simultaneously responsive to characteristics of the human pulse as impressed on said variable-resistance means.

A further object of the invention is to provide pulse monitoring apparatus which is sensitive yet inexpensive to produce and to maintain and well within the budget of the smallest hospital, clinic or ambulance unit.

Still another object of the invention is to provide portable audio-visual pulse monitoring apparatus wherein a pressure responsive mechanism is utilized with the novel circuity of a transistorized oscillator-amplifier combination circuit to produce both audio and visual presentation of characteristics of a person's pulse.

It is, moreover, my purpose and object generally to improve the structure and efficiency of pulse monitoring repetitive-surge indicators.

In the accompanying drawings:

Fig. 1 is a front elevational view of an electrically responsive repetitive-surge indicator embodying features of the present invention;

Fig. 2 is a top plan view of the indicator of Fig. 1;

Fig. 3 is a right end elevation of the indicator of Figs. 1 and 2;

Fig. 4 is a wiring diagram showing the electrical system of the indicator of Figs. 1–3; and Fig. 5 is a fragmentary wiring diagram showing a double-acting variable resistance sensing device connected in the circuit of Fig. 4 in place of the sensing device of Fig. 4.

Referring to the drawings, the embodiment of the invention as illustrated in Figs. 1–4 comprises a two-part casing having one generally inverted U-shaped section 10 which provides the front, top and rear walls of the casing, and having another generally U-shaped section 12 which provides the bottom and opposite end walls of the casing. Sections 10, 12 may be formed of any suitable relatively hard and durable light weight material, preferably an electrical insulating material. For example, the sections 10, 12 may be pressed, molded or otherwise formed from any of numerous available plastic or composition materials. Advantageously, the material may be laminated with plies of commercially available "Boltaron," or the like, selected and assembled for neutralizing or tending to neutralize any static charges acquired by the material. As represented, the section 10 is arranged between the end walls 14, 16 of section 12 which end walls are slotted at 15, 17 adjacent their free ends for reception of projecting tongues 18, 20 at opposite edges of the top wall 22 of section 10. Bottom wall 24 of section 12 is slotted at 25, 25 for reception of tongues 26, 26 at the end edge of front wall 28 of section 10, and is slotted at 25', 25' for reception of tongues 30, 30 at the end edge of rear wall 32 of section 10. The casing walls may be sufficiently resiliently yieldable to permit the said tongues to snap into the said slots for releasably securing sections 10, 12 in assembled relationship. A carrying handle 34 is shown pivotally secured to end walls 14, 16, by means of projecting pins 36 on said end walls engaging in suitable holes 38 in the generally parallel portions of the handle.

All of the circuitry and operating parts of the indicator conveniently may be mounted on casing section 10, a visual indicator-meter being represented at 40, a loudspeaker at 42 and an on-off switch knob at 44 exteriorly of front wall 28. Top wall 22 has mounted exteriorly thereon a sensitivity-control knob 46, volume-control knob 48, plug-in socket 50, and manually operable button 52 for manually checking, at will, the condition of a battery which is later identified herein. A jack-plug 54 is shown removably inserted in socket 50, with a conductor cord 56 leading from plug 54 to a conventional variety of variable resistance sensing device 58 whose electrical resistance varies in response to pressure changes. Device 58, for example, may include a relatively sensitive carbon resistor which normally offers relatively high resistance to passage of current but which, when subjected to pressure offers less and less resistance to current flow with increase of pressure thereon. The device 58 is of a nature to be applied to the wrist, or other portion of a person's body, for responding to pulsations of the human pulse, for example. Any suitable means, such as strap 60 may be associated with device 58 to facilitate mounting of the device in operative position on a person's wrist, or other portion of the body.

The electrical system of my improved indicator is diagrammatically represented in Fig. 4 and comprises a transistorized oscillator circuit whose transistor is indicated at 62, and a transistorized class B amplifying circuit whose transistor is indicated at 64, the said circuits being coupled together and energized by a low voltage battery 66 which is represented as removably supported on the inner side of rear wall 32. The pressure-responsive variable resistor device 58, through cord 56, has one terminal 68 connected through protective resistance 70 to ground and through stabilizing resistance 72 to the emitter of the standard high gain P–N–P junction transistor 62. The other terminal 69 of device 58 is connected to ground. Resistance 70 prevents arcing in the event that the sensing device 58 were to be plugged into socket 50 while the electrical system was energized. Resistance 72, on the other hand, acts to stabilize emitter current and to maintain its proper value, during oscillations of the system. The base of transistor 62 is adjustably connected to one side of a sensitivity control potentiometer 74 and, through bias resistance 76, to the plate of diode 78 whose cathode is connected to the negative side of the battery 66 which should deliver current of voltage between 9–14 volts for efficient operation of the device. The positive side of the battery is connected through the resistance of potentiometer on-off switch 80 to ground. Switch 80 is manually operable by means of knob 44 on casing front wall 28 to turn the device from off position to fully on position by progressively reducing the resistance at the switch 80.

Diode 78 protects transistors 62, 64 and visual indicator-meter 40 by conducting only when its plate is positive with respect to its cathode. Hence, it ensures against damage to the system in the event of polarity reversal of battery 66.

The plate of diode 78 is connected also through visual indicator-meter 40 which may be a milliammeter connected to one side of a tank circuit. The tank circuit comprises resistance 82 and the primary of transformer 84, the other side of the tank circuit being connected to the collector of transistor 62. Indicator-meter 40 has a milliampere scale 40' thereon along which pointer 41 is movable, and the pointer is movable also along a voltage scale 40" in response to depression of the button 52 on casing top wall 22 which actuates a switch 86 for disconnection of the meter from the tank circuit and connection of it to ground through suitable resistance, thereby to get a voltage reading indicating the condition of the battery 66. The arrow at the 8-volt point on the voltage scale indicates the point below which the device ceases to be entirely efficient, warning that the battery 66 should be replaced. A shunting resistance 71 is used with switch 86 to avoid arcing when the switch 86 is released.

The secondary of transformer 84 is coupled back to the base of transistor 62 through capacitor 85. The said transformer secondary also is coupled through capacitor 88 to the input of a single stage amplification circuit which comprises the transistor 64, resistance 90 which biases the emitter-base circuit of transistor 64, volume control potentiometer 92, and the output amplifier-speaker unit indicated at 94.

In operation, potentiometer on-off switch 80 is turned to the on position, the resistance being gradually lessened as the switch is rotated until the positive side of battery 66 is essentially grounded. This gradual build-up of voltage prevents the possibility of arcing when the switch is turned on.

The condition of battery 66 may be quickly checked on voltage scale 40" by depressing button 52 thereby completing the circuit containing battery 66, indicator-meter 40 and resistance 87, said resistance 87 being selected to give a particular scale deflection of meter pointer 41 when battery 66 is fully charged.

An impulse received by sensing device 58 decreases its resistance thereby offering a sufficiently low resistance from the emitter of transistor 62 to ground to allow transistor 62 to conduct, the input current at the base of transistor 62 being reversed in phase. In the transformer 84, the current is again reversed in phase and its magnitude is changed in an amount determined by the turns ratio of the transformer and fed back to the base of transistor 62 in phase to produce oscillation of the system if the current in the secondary of transformer 84 greatly exceeds the input current at the base of transistor 62. Oscillation of the system will continue until a decrease in pressure at sensing device 58 causes an increase in resistance at device 58 and consequently a decrease in the emitter voltage, said voltage being insufficient to maintain oscillation of the system. The point of oscillation of the system may be varied by sensitivity potentiometer 74. When the sensing device 58 is properly attached to the patient, the potentiometer 74 is adjusted so that the system will go into oscillation with the start of each thrust of the pulse and cease at the end of each pulse. Thus the duration of oscillation of the system is a measure of the pulse duration of each individual pulse surge and the interval between each oscillation gives the interval between successive surges. Relative pulse intensities may be obtained by properly adjusting the sensitivity control potentiometer 74.

The oscillations produced in the above manner are transformer coupled to a conventional transistorized amplifier whose transistor 64 has emitter-base biasing resistance 90. Also, as the transistors are conducting during oscillation, each oscillation will be indicated visibly by the deflection of the needle of meter 40, such deflection being of an amount in proportion to the current flow in the collector circuits of transistors 62 and 64.

My improved audio-visual instrument for indicating characteristics of the human pulse, or other varieties of repetitive surges, is inexpensive to produce and to maintain, light in weight and compact for convenience in carrying it from place to place, and is sensitively accurate for indicating pulse frequency, the duration and strength of individual pulses, without any danger of arcing in a room or enclosure where the air may be highly charged with ether or other explosive anesthetizing agent.

If desired the pulse sensing device 58 may be of a variety for more positive response both to the pulse surge and the pulse recession, in which case two resistance elements would be within such a sensing device 58' (Fig. 5) with one diminishing in resistance in response to pulse surges and the other increasing in resistance in response to pulse surges, the required third conductor in this case being connected to the base of transistor 62, as shown in Fig. 5.

Any conventional counting circuit may be employed with the disclosed apparatus to give direct visual indication of the pulse rate. Also, the apparatus may be used to operate lights or bells to enable one person in a hospital ward to monitor many patients and immediately become aware of abnormal pulse activity in any one of the patients.

These and other various changes may be made in the details of the disclosed instrument within the scope of the appended claims, and it is intended that the patent shall cover, by suitable expression in the appended claims, whatever features of patentable novelty exist in the invention disclosed.

I claim as my invention:

1. An electrically responsive repetitive-surge indicator, comprising a low voltage, battery-powered transistorized oscillator circuit, a class B transistorized amplifier circuit coupled to said oscillator circuit for amplifying the oscillations of the oscillator circuit, resistance means adapted to be secured in operative relation to a surging medium, each surge of said medium acting on said resistance means, for the duration of any particular surge, to change its resistance more or less depending upon the magnitude of the thrust of said particular surge, electrical connections between said resistance means and said oscillator circuit whereby an oscillation of the oscillator circuit occurs and persists only in response to and for the duration of a said change of resistance of said resistance means, and a visual indicator in said oscillator circuit, responsive to each said oscillation, for visually indicating the strength and duration of each oscillation as amplified by said coupled amplifying circuit.

2. An electrically responsive repetitive-surge indicator as defined in claim 1 wherein an audio signal means is in said amplifying circuit and responsive to each oscillation of said oscillator circuit for audibly indicating the strength and duration of each oscillation as amplified by said coupled amplifying circuit.

3. A low-voltage, battery-powered, readily portable instrument for indicating characteristics of the human pulse, comprising a casing, a transistorized oscillator circuit having its wiring and appurtenances enclosed within said casing, a transistorized amplifier circuit transformer-coupled to said oscillator circuit and having its wiring and appurtenances enclosed within said casing, a battery removably mounted within said casing and connected for energizing said circuits, a visual indicator mounted in a wall of said casing and connected in said oscillator circuit, an audio indicator mounted on a wall of said casing and connected in said amplifying circuit, variable resistance means exteriorly of said casing having means associated therewith for securing said resistance means on a person's wrist in operative relation to the pulse, the resistance of said resistance means being arranged and adapted to become reduced in response to each surge of the pulse, said resistance means being connected in said oscillator circuit for effecting an oscillation of the oscillator circuit only in response to each surge of the pulse, and said indicators responding to the oscillations respectively in said oscillator circuit and said amplifying circuit to provide visual and audio indications of characteristics of the pulse surges.

4. An instrument as defined in claim 3 wherein said transistorized amplifying circuit is a class B circuit and said connection of the resistance means in said oscillator circuit is a plug-in conductor cord connection through a wall of said casing.

5. An instrument as defined in claim 3 wherein said visual indicator is a milliampere meter having a scale and a pointer actuatable over a substantial range of said scale in response to each pulse-surge-produced oscillation of said oscillator circuit, said visual indicator also having a voltage scale and means for manually effecting an actuation of said pointer to indicate at will on said voltage scale the strength of said battery.

6. An instrument as defined in claim 3 wherein a switch means on a wall of said casing is manually operable to energize said oscillator and amplifying circuits only through a progressively diminishing resistance.

7. An instrument as defined in claim 3 wherein said variable resistance means comprises a relatively high resistance element whose resistance materially diminishes in response to pressure applied to said resistance element.

8. An instrument as defined in claim 3 wherein said variable resistance means comprises two relatively high resistance elements, the resistance of one of said elements materially diminishing and the resistance of the other materially increasing in response to pressure applied thereto in response to thrust of a pulse surge, and the resistance of said one of the elements materially increasing and the resistance of said other materially diminishing in response to cessation of the pulse surge.

9. An instrument as defined in claim 3 wherein said casing has two readily seperable inter-fitting sections of which one section has within it the said battery and all of the said wiring and appurtenances of both of said coupled circuits readily exposable by separating said casing sections.

10. An instrument as defined in claim 3 wherein said casing is formed of laminated plastic material whose laminations tend to neutralize any static electrical charges acquired by said material.

11. A low voltage, battery powered, readily portable instrument for indicating characteristics of a pulsing medium, comprising a casing, a transistorized oscillator circuit having its wiring and appurtenances enclosed within said casing, a transistorized amplifying circuit coupled to said oscillator circuit and having its wiring and appurtenances enclosed within said casing, a battery removably mounted within said casing, and connected for energizing said circuits, a visual indicator mounted on a wall of said casing and connected in said amplifying circuit, an audio indicator mounted on a wall of said casing and connected in said amplifying circuit, variable resistance means exteriorly of said casing having means associated therewith for securing said resistance means in operative relation to a surging medium, the resistance of said resistance means being arranged and adapted to become reduced in response to each surge of said surging medium, said resistance means being connected in said oscillator circuit for effecting an oscillation of the oscillator circuit only in response to each said surge, and said indicators responding to the amplified oscillations to provide visual and audio indications of characteristics of the surges.

12. An instrument as defined in claim 11 wherein said visual indicator is connected in both the oscillator and the amplifying circuits.

References Cited in the file of this patent

UNITED STATES PATENTS

| | | |
|---|---|---|
| 2,756,741 | Campanella | July 31, 1956 |
| 2,801,629 | Esmark | Aug. 6, 1957 |

OTHER REFERENCES

Molyneux et al., British Journal of Anaesthesia, 27, 262, (1955). (Copy in Armed Forces Library.)

Molyneux, Electronics Engineering, 29, 125 (March 1957). (Copy in Scientific Library.)